US008214424B2

(12) United States Patent
Arimilli et al.

(10) Patent No.: US 8,214,424 B2
(45) Date of Patent: Jul. 3, 2012

(54) USER LEVEL MESSAGE BROADCAST MECHANISM IN DISTRIBUTED COMPUTING ENVIRONMENT

(75) Inventors: Lakshminarayana B. Arimilli, Austin, TX (US); Ravi K. Arimilli, Austin, TX (US); Robert S. Blackmore, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 12/424,837

(22) Filed: Apr. 16, 2009

(65) Prior Publication Data
US 2010/0269027 A1 Oct. 21, 2010

(51) Int. Cl.
*G06F 15/16* (2006.01)
(52) U.S. Cl. ......... 709/201; 709/200; 709/202; 719/312
(58) Field of Classification Search ................... 709/252, 709/200–202, 312, 315
See application file for complete search history.

(56) References Cited

U.S. PATENT DOCUMENTS

| 5,617,537 | A | | 4/1997 | Yamada et al. |
| 5,870,564 | A | * | 2/1999 | Jensen et al. ................... 709/241 |
| 6,356,801 | B1 | | 3/2002 | Goodman et al. |
| 6,782,492 | B1 | * | 8/2004 | Nakaso ........................... 714/42 |
| 7,117,241 | B2 | * | 10/2006 | Bloch et al. .................... 709/201 |
| 7,231,638 | B2 | | 6/2007 | Blackmore et al. |
| 7,395,536 | B2 | * | 7/2008 | Verbeke et al. ................ 718/100 |
| 7,533,141 | B2 | * | 5/2009 | Nadgir et al. .................. 709/200 |
| 7,730,121 | B2 | * | 6/2010 | Howard et al. ................. 709/201 |
| 2006/0080668 | A1 | | 4/2006 | Blackmore et al. |
| 2007/0061483 | A1 | * | 3/2007 | Dauger ........................... 709/238 |

OTHER PUBLICATIONS

Jegou, Y., "Coupling DSM-Based Parallel Applications," Proceedings of the 1st IEEE/ACM International Symposium on Cluster Computing and the Grid, pp. 82-89, 2001.

* cited by examiner

*Primary Examiner* — Ramy M Osman
(74) *Attorney, Agent, or Firm* — Yudell Isidore Ng Russell PLLC

(57) ABSTRACT

A data processing system is programmed to provide a method for enabling user-level one-to-all message/messaging (OTAM) broadcast within a distributed parallel computing environment in which multiple threads of a single job execute on different processing nodes across a network. The method comprises: generating one or more messages for transmission to at least one other processing node accessible via a network, where the messages are generated by/for a first thread executing at the data processing system (first processing node) and the other processing node executes one or more second threads of a same parallel job as the first thread. An OTAM broadcast is transmitting via a host fabric interface (HFI) of the data processing system as a one-to-all broadcast on the network, whereby the messages are transmitted to a cluster of processing nodes across the network that execute threads of the same parallel job as the first thread.

20 Claims, 7 Drawing Sheets

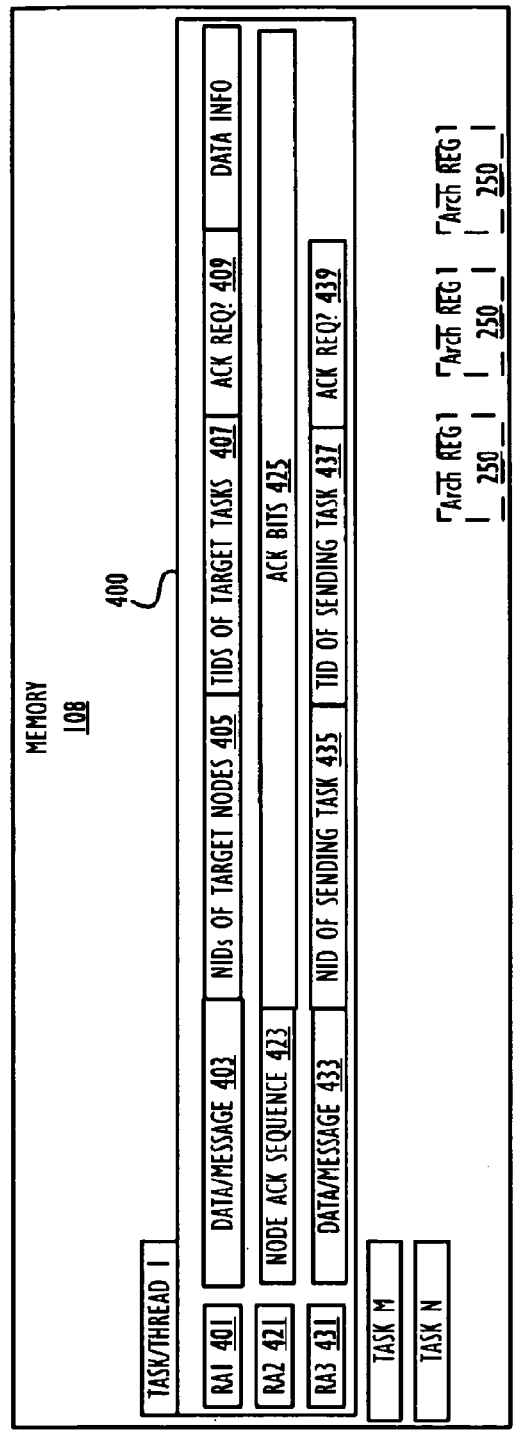

USER LEVEL MESSAGE BROADCAST MECHANISM IN DISTRIBUTED COMPUTING ENVIRONMENT

GOVERNMENT RIGHTS

This invention was made with Government support under DARPA, HR0011-07-9-002. THE GOVERNMENT HAS CERTAIN RIGHTS IN THIS INVENTION.

BACKGROUND

1. Technical Field

The present invention generally relates to data processing systems and in particular to distributed data processing systems. Still more particularly, the present invention relates to communication among tasks executing in distributed data processing systems.

2. Description of the Related Art

It is well-known in the computer arts that greater computer system performance can be achieved by harnessing the processing power of multiple individual processing units. Multi-processor (MP) computer systems can be designed with a number of different topologies, of which various ones may be better suited for particular applications depending upon the performance requirements and software environment of each application. As the size of the processing systems scale upwards with demands for more processing power and less localized clustering of hardware, processing architecture has advanced from: (a) symmetric multi-processor (SMP) architecture in which multiple processing units, each supported by a multi-level cache hierarchy, share a common pool of resources, such as a system memory and input/output (I/O) subsystem, which are often coupled to a shared system interconnect; followed by (b) non-uniform memory access (NUMA) architecture, which includes a switch or other global interconnect to which multiple nodes, which can each be implemented as a small-scale SMP system, are connected; parallel computing architecture, in which multiple processor nodes are interconnected to each other via a system interconnect or fabric, and the multiple processor nodes are then utilized to execute specific tasks, which may be individual/independent tasks or parts of a large job that is made up of multiple tasks. Even more recently, the parallel computing architecture has been further enhanced to enable support for tasks associated with a single job to share parts of their effective address space (within a global address space (GAS) paradigm) across physical or logical partitions or nodes.

One negative to the configuration of computing systems that include multiple parallel processing nodes distributed over large geographical networks, is that the threads of each task within a job are limited to communicating via the MPI collectives model. Under this model, specific commands are provided that forces each thread to share information via the network to every other thread executing within the job, one thread at a time, and for each thread to receive a result/answer from every other thread executing within the job. Thus, threadA (a) talks with threadB, receives an answer from thread, (b) talks to threadC, receives an answer form threadC, and so on, until threadA receives an answer from threadN, where N is an integer representing the total number of other threads executing within the job. This use of MPI collectives is bandwidth intensive and each message issued by a task incurs a substantially high latency to complete on the network (across the multiple nodes assigned to the job).

SUMMARY OF ILLUSTRATIVE EMBODIMENTS

Disclosed are a method, computer system, and computer program product for providing user level message broadcast within a distributed parallel computing environment having a global shared memory (GSM). The disclosed embodiments provide: in a first processing node of a distributed data processing system having multiple processing nodes executing threads of a parallel job, a method for efficient inter-node communication among threads of the parallel job. The method comprises: generating at the first processing node one or more messages for transmission to at least one other processing node accessible via a network, wherein the one or more messages are generated by/for a first thread executing at the first processing node and the at least one other processing node executes one or more second threads of a same parallel job as the first thread; and transmitting via a host fabric interface (HFI) the one or more messages via a one-to-all broadcast on the network, wherein the one or more messages are transmitted to a cluster of processing nodes across the network that execute threads of the same parallel job as the first thread.

According to one embodiment, the generating comprises: storing data of the one or more messages within one or more of an one to all messaging (OTAM) facility and an architected register assigned to the first thread; and generating an OTAM operation comprising the data of the one or more messages, an identifier (ID) of the first thread, and an ID of the parallel job. Also, the transmitting comprises: forwarding the OTAM operation to a host fabric interface (HFI) of the first processing node; generating a transmission packet from information within the OTAM operation; and issuing the OTAM operation as a transmission packet by the HFI.

In one embodiment, the method further comprises: establishing a one to all messaging (OTAM) facility within a memory of the first processing node during set up of the first thread for execution at the first processing node; and providing the first thread with access to the OTAM facility. In one implementation, the establishing an OTAM facility includes: establishing one or more architected registers within the first processing node during set up of the first thread for execution at the first processing node; and providing the first thread with access information to the one or more architected registers.

Other aspects of the method comprises: including a request for an acknowledgement in the OTAM operation, wherein the issued one or more messages include a request to a receiving node that is processing a related thread to respond to receipt of the one or more messages with an ACK response; when an ACK response is received, updating an entry within an OTAM ACK facility to indicate receipt of the ACK response from a node executing a related thread from which the ACK response originated; and when all ACK responses are received, signaling the first thread of a completion of the OTAM broadcast and receipt by all intended recipients of the OTAM broadcast. Within this embodiment, the method may also provide: activating an ACK response timer to check for receipt of a full complement of ACK responses from all related threads of the parallel job executing at other nodes; and signaling failure of a completion of the OTAM broadcast when the full complement is not received before expiration of the timer.

Still one other aspect of the method provides: forwarding one or more data to an OTAM messaging facility for transmission via an OTAM broadcast; checking an amount of data within the OTAM messaging facility against a pre-established threshold/barrier point; and triggering the HFI to initiate the transmitting of the one or more messages when the amount of data reaches the pre-established threshold/barrier point. Further, the method may provide: receiving an OTAM instruction during execution of the first thread; initiating the generating of the one or more messages in response to the receiving the OTAM instruction; and when the OTAM instruction indicates an immediate transmission is required, triggering the transmitting of corresponding OTAM data at an earliest available broadcast slot of the HFI, wherein no barrier point is required to be met within the OTAM facility before initiating the OTAM broadcast.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 illustrates an example one-to-all instruction which triggers the one-to-all broadcast of a message from a first thread to other threads of a job executing on multiple nodes of the distributed data processing system, according to alternate embodiments of the invention;

FIG. 4 illustrates an internal view of memory configured with assigned real address locations that support the one-to-all broadcast of messages within a multimode GSM environment, in accordance with one embodiment of the invention;

DETAILED DESCRIPTION OF AN ILLUSTRATIVE EMBODIMENT

Figure 1:
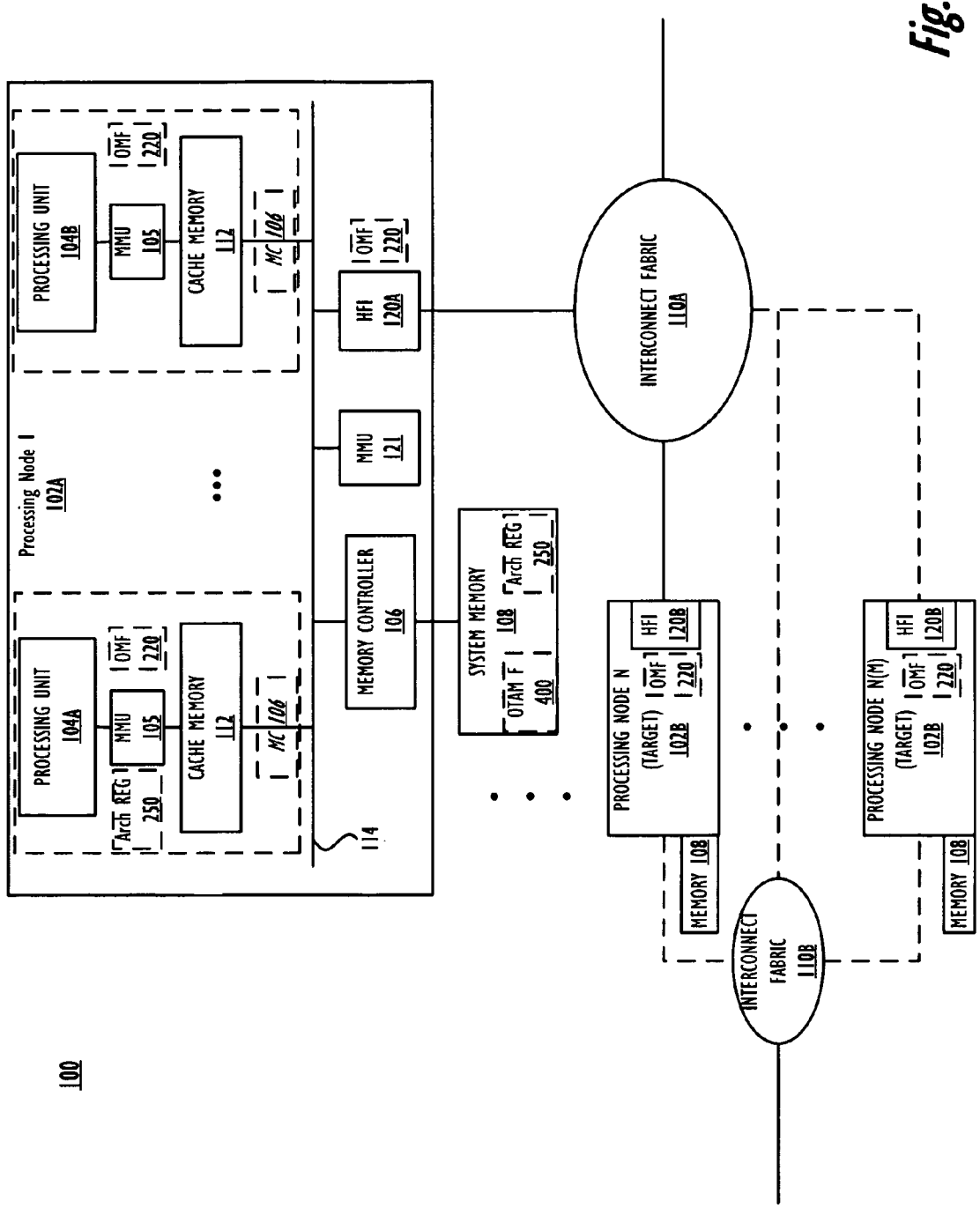
FIG. 1 illustrates an example multi-node, parallel computing, distributed data processing system with a host fabric interface (HFI) provided at each node to enable global shared memory (GSM) operations across the processing nodes, according to one embodiment of the invention.

The illustrative embodiments provide a method and data processing system for generating at the user level and transmitting via broadcast one-to-all messages (OTAM) from a first thread of a parallel job to each other related thread of the parallel job that is executing at one or more remote nodes across a distributed data processing system. A data processing system is programmed to provide a method for enabling user-level one-to-all message/messaging (OTAM) broadcast within a distributed parallel computing environment in which multiple threads of a single job execute on different processing nodes across a network. The method comprises: generating one or more messages for transmission to at least one other processing node accessible via a network, where the messages are generated by/for a first thread executing at the data processing system (first processing node) and the other processing node executes one or more second threads of a same parallel job as the first thread. An OTAM broadcast is transmitting via a host fabric interface (HFI) of the data processing system as a one-to-all broadcast on the network, whereby the messages are transmitted to a cluster of processing nodes across the network that execute threads of the same parallel job as the first thread.

With the structure implemented herein, each tasks within the job will be allocated a small (in relative size) location referred to as the OTAM storage facility in which the task may receive data from every other related task. With the full-connected, multi-tiered configuration of the distributed system using HFIs at each node, each tasks will be able to broadcast a small amount of data from one-to-all at a relatively high speed (i.e., a low latency inter-task communication operation).

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, the following terms, which are utilized herein, are defined as follows:

(1) Effective, virtual, and real address spaces: a user-level program uses effective addresses (EAs), which are translated into operating system (OS)-specific virtual addresses (VAs). The OS and the hardware memory management units (MMUs) translate VAs into real addresses (RAs) at the time of use.

(2) Node: the set of computing resources that form the domain of a coherent operating system (OS) image.

(3) Cluster: a collection of two or more nodes.

(4) System: the collection of all nodes in the cluster domain.

(5) Parallel Job: an application that executes on some or all the nodes in a cluster. A job is made up of tasks (processes), each of which executes in a node domain in the cluster. A parallel job has various attributes including a job ID that uniquely identifies the parallel tasks that comprise the parallel job in the entire system.

(6) Task: a single process that executes within a single effective address (EA) space. By definition, a task executes wholly within a node. However, multiple tasks in a parallel job may execute on the same node (typically proportional to the number of CPUs on the node). A task can include one or more threads of control that all view and share the same effective address (EA) space.

(7) Global shared memory (GSM)-enabled job: a parallel job, in which the component tasks have arranged to make parts of their individual effective address (EA) spaces accessible to each other via global shared memory (GSM) operations.

(8) Global address space (GAS): the union of all effective addresses (EAs) in a GSM job that are accessible to more than one task via GSM operations.

As further described below, implementation of the functional features of the invention is provided within processing nodes and involves use of a combination of hardware, firmware, as well as several software-level constructs. The presented figures illustrate both hardware and software components within an example distributed, parallel computing environment in which multiple physically separate nodes, interconnected via respective HFIs and one or more interconnects, provide a distributed data processing system that executes a parallel job as individual tasks (with associated threads of instructions) that utilize a GSM. The presentation herein of a specific number of physical nodes, i.e., a message originating node (node 1) and multiple target/receiving nodes (node 2 through N, N(M)) is provided solely to simplify the description of the functionality associated with all-to-one broadcast messaging within the distributed system. It is appreciated that this all-to-one broadcast messaging function operates well within a GSM environment configured with HFIs and which enables scaling to a much larger number of processing nodes within a single data processing system, while conserving bandwidth and reducing latency during node-to-node or task-to-task communications/messaging.

B. Hardware Features

Turning now to the figures, and in particular to FIG. 1, which illustrates an example distributed, multi-node Data Processing System (DPS) within which the described embodiments are advantageously implemented. Distributed DPS 100 comprises a plurality of processing nodes of which processing node1 102A and processing nodes N and N(M) 102B are illustrated. Processing node1 102A and processing nodes N and N(M) 130 are interconnected via interconnect fabric/switch 110A via respective network interface controllers (NIC) 125. Interconnect fabric/switch 110A may be a single general interconnect to which all nodes connect or may comprise one or more subnets (110B) connecting a subset of the processing nodes (e.g., subnet 110B may connect processing node N(M) to processing node N, and processing node N(M) may connect indirectly to processing node 1 102A via subnet 110B in one of several alternate configurations. Each NIC may be configured as a host fabric interface (HFI) and provide HFI functionality related to global shared memory operations, as described within U.S. patent application Ser. No. 12/024,163, relevant content of which is incorporated herein by reference.

Generally, that disclosure provides a method and data processing system for generating and processing global shared memory (GSM) operations that complete parallel job execution of multiple tasks on different physical nodes with distributed physical memory that is accessible via a single, shared, global address space (GAS). Each physical node of the data processing system has a host fabric interface (HFI), which includes one or more HFI windows with each window assigned to at most one locally-executing task of the parallel job, although multiple windows may be assigned to a single task. The HFI includes processing logic for completing a plurality of operations that enable parallel job execution via the different tasks, each of which maps only a portion of the effective addresses (EAs) of the shared GAS to the local (real or physical) memory of that node. Each executing task within a node is assigned a window within the local HFI. The window ensures that issued GSM operations (of the local task) are correctly tagged with the job ID as well as the correct target node and window identification at which the operation is supported (i.e., the EA is memory mapped). The window also enables received GSM operations with valid EAs in the task to which the window is assigned to be processed when received from another task executing at another physical node, while preventing processing of received operations that do not provide a valid EA to local memory mapping. The details about the mechanism by which the address allocations within the GAS is completed across multiple nodes is not provided in any detail herein, as that is not the focus of the present invention.

Returning now to FIG. 1, interconnect fabric 110 supports data communication between processing nodes 102 in accordance with one or more interconnect and/or network protocols. Interconnect fabric 110 may be implemented, for example, utilizing one or more buses, switches and/or networks. Any one of multiple mechanisms may be utilized by the HFI 120 to communicate across the interconnect 110. For example, and without limitation, HFI 120 may communicate via a proprietary protocol or an industry standard protocol such as Infiniband, Ethernet, or IP (Internet Protocol).

As utilized herein, the term "processing node" (or simply node) is defined as the set of computing resources that form the domain of a coherent operating system (OS) image. For clarity, it should be understood that, depending on configuration, a single physical system may include multiple nodes. Also, the use of the variable "N" as the reference number of processing node N 160 indicates that distributed DPS 100 can include a variable number of separate processing nodes, with N being an integer of any size greater than 1. It is appreciated that the GSM functionality enables scaling to a much larger number of processing nodes within a single distributed data processing system. The number of processing nodes 102 deployed in a given system is implementation-dependent and can vary widely, for example, from a few nodes to many thousand nodes. The variable N(M) is utilized to indicate that the size of the network (i.e., the number of interconnected nodes) may be scaled up by some multiplier, where N intermediary nodes each operates as a staging point within the distributed system for forwarding a message received from node 1 102A to an additional M nodes connected to that intermediary node. Within the described embodiments, processing node 1 102A is assumed to be the source node from which a message is generated and transmitted, while processing node N 102B represents the N first level destination/target nodes for receipt of the message from node 1, and processing node N(M) 102C represents the M second level destination/target nodes for receipt of the message from node 1 102A.

Each processing node may be implemented, for example, as a single integrated circuit chip (e.g., system-on-a-chip (SOC)), a multi-chip module (MCM), or circuit board, which contains one or more processing units 104 (e.g., processing units 104A, 104B) for processing instructions and data. Further, each processing unit 104 may concurrently execute one or more hardware threads of execution. Each processing node may also be assumed to be a server (server 1, server N, server N(M)). Each processing node has associated therewith system memory 108, within which are multiple physical locations tagged with real addresses and allocated to specific effective addresses within a global address space, as described in greater detail hereinafter.

Additional internal components of processing node 1 102A are illustrated and described herein and represent example components that may be found within any one of the processing nodes of distributed DPS 100. It should be understood, however, that the processing nodes are not necessarily symmetric in makeup and may be configured very differently from example processing node 1 102A. Processing node 1 102A comprises multiple processing units, of which two processing units 104A, 104B (also known as and interchangeably referred to herein as central processing units (CPU)) are shown. Noted is the fact that, in some implementations, each separate processing unit within processing node 1 102A may be considered a separate processing node; However, for simplicity in describing the various embodiments, each processing node is assumed to be a separate physical device having its own separate memory component and connected to the other processing nodes via interconnect fabric 110.

In the configuration of FIG. 1, each processing unit 104 is supported by cache memory 112, which contains one or more levels of in-line or look aside cache. As is known in the art, cache memories 112 provide processing units 104 with low latency access to instructions and data received from source (s) within the distributed system. The processing units 104 within each processing node 102 are coupled to a local interconnect 114, which may be implemented, for example, with one or more buses and/or switches. Local interconnect 114 is further coupled to NIC/HFI 125, which supports/enables data communication between processing nodes 102.

As further illustrated in FIG. 1, processing nodes 102 typically include at least one memory controller 106, which may be coupled to local interconnect 114 to provide an interface to a respective physical system memory 108. In alternative embodiments of the invention (illustrated by the dashed representations of memory controller (MC)), one or more memory controllers 106 can be coupled to interconnect fabric 110 or be provided directly on the processor chip rather than as a separate component coupled to local interconnect 114.

In addition to memory controller, each processing unit 104 may also include a memory management unit (MMU) 105 to translate effective addresses to real (or physical) addresses. These MMUs 105 perform EA-to-RA translations for tasks executing on processing nodes (e.g., node 102A) of data processing system 100. However, aspects of the invention may also utilize a separate MMU 121, which is coupled to the local interconnect 114. MMU 121 performs EA-to-RA translations for operations received from tasks operating on remote processing nodes (e.g., node 102B) of data processing system 100. In one implementation of processor configurations, MMU 121 may be integrated with NIC/HFI 125 so as to support EA-to-RA address translations required by NIC/HFI and/or tasks utilizing HFI to complete GSM operations.

The NIC/HFI 125 and functional components thereof, which are described below, enables the task(s) executing on processing units 104a/104b to generate operations to access the physical memory 135/165 of other nodes that are executing other tasks of the parallel job using EAs from a shared global address space (GAS) and a GSM. Likewise, NIC/HFI 125 enables access by the executing threads (of task(s)) on initiating node 102A to access physical memory on other processing nodes.

Those skilled in the art will appreciate that data processing system 100 of FIG. A can include many additional components, which are not illustrated herein, such as interconnect bridges, non-volatile storage, ports for connection to networks or attached devices, etc. Because such additional components are not necessary for an understanding of the present invention, they are not illustrated in FIG. 1 or discussed further herein. As will be explained in greater detail below, NIC/HFI 125 enables SMP 122 to connect to and communicate with other remote devices, such as processing node N 102B, via a network, such as the Internet (not shown). Processing node 102B may be similarly configured to DPS 100, but not necessarily so. More importantly, in one embodiment, processing node 102B shares a global address space (GAS) with processing node 1 102, such that both devices utilize a subset of the same set of effective addresses (EAs), some of which are mapped to local memory on each device. With this configuration of shared EAs, processing unit 104 may perform operations, which transmits messages from a thread executing on processing unit 104 to other threads executing on other processing nodes (102B, 102C) and receive single bit acknowledgements from each target node to which the message is transmitted.

In order to support the one-to-all message transmission functionality described herein, each processing node is provided a one-to-all messaging (OTAM) flag (OMF) 220, assocaited OTAM logic, which may be a hardware component of software implemented logic (e.g., OMF 220 may be such logic and may include the flag as a component thereof). OTAM logic (220) and/or processor logic responds to a request for a message transfer to other threads located at processing nodes by having the processing unit place the message information in a particular location in memory (referred to herein as the OTAM facility (OTAM F) 400) and then triggering the HFI logic to transmit the message to all threads across the various processing nodes. These processes are described in greater detail hereinafter. Additionally, in one embodiment, the OTAM messages (received and/or generated) may also be stored/hosted within one or more architected registers 250, which may be on-processor, in memory 108, or at some other location within processing unit 102. Each thread (including threads of a same job) executing within the node may have its own OTAM F 400 and/or architected register 250; However in one embodiment, threads of a same job may share an OTAM F 400 and/or architected register 250.

Figure 2:
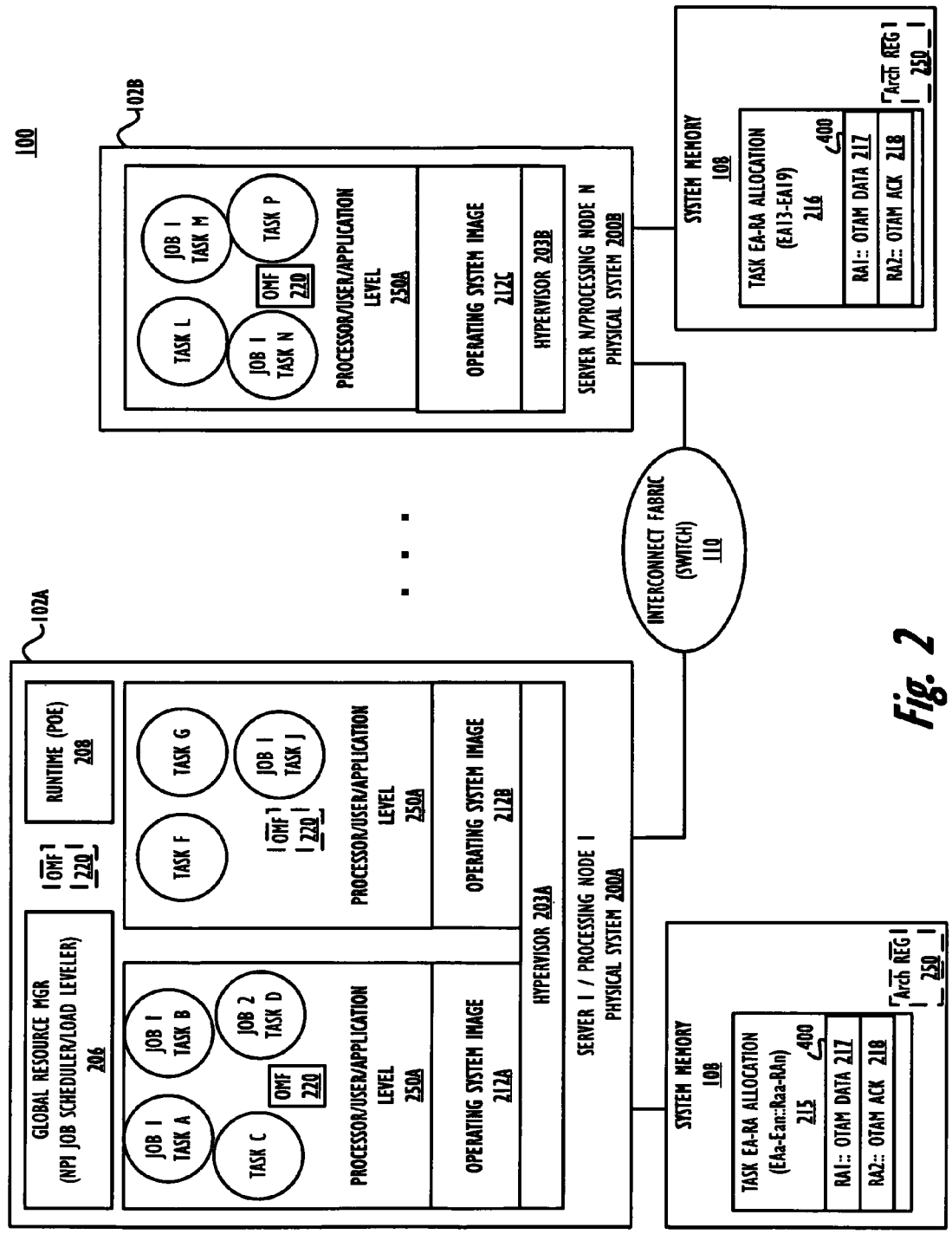
FIG. 2 illustrates the allocation of tasks of a single job across partitions and nodes and corresponding memory allocations within a multi-node GSM environment (such as data processing system of FIG. 1), according to one embodiment of the invention.

The above described physical configuration of processing nodes of the example distributed DPS 100 interconnected via NICs/HFIs 125 support the distribution of tasks associated with a parallel job across multiple processing nodes within a larger system with a GSM. FIG. 2 illustrates a high level view of software components that enable processing of multiple tasks of a parallel job within an exemplary software environment for DPS 100, in accordance with one embodiment. In the exemplary embodiment, DPS 100 includes at least two physically separate processing nodes 102A and 102B of FIG. 1) coupled by interconnect fabric 110. Each processing node contains an operating system image 212 which controls OS-level operations within that particular processing node. The OSes executing within each physical system 200 may be homogeneous or heterogeneous. First processing node 102A is depicted with two different OS images to illustrate an embodiment in which a single physical device supports multiple processing nodes. Notably, for simplicity, only one node of each physical system is utilized in the descriptions of the one-to-all messaging functions herein, although the features of the invention are fully applicable to tasks executing on any one of multiple nodes on a single physical system accessing physical memory of other nodes on other physical system(s).

Each processing node 102 may further include an instance of hypervisor 203 (also referred to as a Virtual Machine Monitor (VMM)). Hypervisor 203 is a program that manages the full virtualization or para-virtualization of the resources of physical system 200 and serves as an operating system supervisor. As such, hypervisor 203 governs the creation and destruction of nodes and the allocation of the resources of the physical system between nodes.

Each node further provides a processor level 250 (also referred to as a user or application level) at which processes related to an application are executed by the processor, in what may be referred to as user space (to differentiate from the OS or hypervisor space). Different jobs and/or tasks are shown within processor level and these jobs/tasks provide threads of instructions/code that are executed by processing units (104, FIG. 1). Actual execution may be via instruction threads of the various tasks and the description herein refers to threads generating messages to communicate with other threads. Thus, for purposes of the descriptions herein, "task" may be utilized interchangeably with "threads" and/or executing threads are assumed to belong to a specific task executing on the processing node. According to the illustrative embodiments, DPS 100 can execute a single job (e.g. Job1) having multiple different tasks or types of tasks, which each execute at/on different ones of the processing nodes. As shown, processing node 1 102A executes Tasks A, B or Job 1, Task D of Job 2, and Task C, while processing node N 102B executes Tasks M and N of Job 1, and Tasks L and P.

The allocation of tasks to specific processing nodes is performed by a global resource manager 206, which executes under operating systems 212 to facilitate the creation and execution of jobs. For example, FIG. 2 depicts a job management program, such as LoadLeveler™ (referred to herein as a global resource manager 206), executing under operating system 212 and a runtime environment 208, such as Parallel Operating Environment™ (POE), also executing under operating system 212. LoadLeveler™ (206) and Parallel Operating Environment™ (208) are both commercially available products available from International Business Machines (IBM) Corporation of Armonk, N.Y.

The generation and distribution of the tasks of a job across processing nodes (e.g., Job 1, illustrated in FIG. 2) is provided by the job management program/global resource manager (GRM) 206, with user-supplied execution attributes in a job command file. These attributes include the number of nodes on which the job needs to execute. The job management program/GRM 206 generates a job ID (that is unique system-wide) and selects a set of nodes in the system on which to execute the parallel job. The job management program/GRM 206 then invokes the runtime system 208 for parallel jobs (e.g., (POE)). The runtime system 208 in turn spawns the user executable on the set of nodes that the job management program/GRM 206 allocated for the parallel job, and the runtime system 208 sets up state that permits each task to determine the task's unique rank ordering within the parallel job. The runtime system 208 also provides the mapping (in the form of a table) between the tasks and the physical nodes on which the tasks are executing.

In order to complete the processing by the HFI and other functional features of the invention, a system-level establishment (or system allocation) of the global shared memory is provided by which the global resource manager assigns tasks to address spaces within the global address space during setup/establishment of the GSM environment. During initialization of the tasks of a parallel job, each task issues a system call to set up the global address space. Once the global address space has been initialized, individual tasks can allocate physical memory that can be globally addressed by all tasks of the job. Memory allocation on each task is achieved through a second system call, which specifies the amount of memory to be allocated, as well as the effective address within the already-reserved global address space (GAS) where the allocated memory must appear. All allocations are done locally with respect to the task issuing the second system call. Once allocation is completed, all threads within the locally-executed task can access the allocated memory using load and store instructions. In addition to reserving effective address space, the system call also accomplishes three additional tasks. First, the call initializes a HFI window hardware structure in preparation for usage in the global shared memory model. Second, the system call creates a send FIFO and a receive FIFO, which allow the task to send active messages to one another via the node's HFI. According to one embodiment, the call further initializes specific real address spaces within the memory to hold the OTAM data and OTAM acknowledgement.

Also illustrated by FIG. 2 are one-to-all messaging (storage) facility OTAM F 400, OTAM logic and/or flag (OMF) 220 and corresponding, assigned OTAM storage locations 217, 218 and/or architected registers 250, which support OMF 220 and enable one-to-all messaging operations and acknowledgement thereof. OMF 220 may be implemented via software logic (OMF or OTAM logic), with a particular sequence of code/instructions (or a unique instruction set architecture, ISA, OTAM instruction) triggering the execution of a one-to-all messaging operation, as described herein. In one embodiment, OMF 220 is a single bit flag that is set by the executing thread when the one-to-many message is initially created for transmission and/or on transmission of the message out to the other processing nodes. The OMF bit is then reset when the message receives an acknowledgment of receipt from each node to which the message was transmitted.

While described herein as two separate components, it should be appreciated that the OTAM storage facility 400 may be synonymous with the one more architected registers 250 and vice versa, though not necessarily so. Embodiments having both components or having just either one of the two types of components are supported by the invention.

FIG. 2 further illustrates the real address allocations within system memory 108 of respective processing nodes 102 of one-to-all operations. Within the distributed environment of DPS 100, the global resource manager 206 assigns each task to a specific node and allocates a specific real address mappings for a subset of the effective addresses (within the GAS) being utilized by that task. As an extension of that assignment and in order to support the one-to-all messaging operations, the global resource manager 206 also assigns several physical memory locations (real addresses) to the one-to-all messaging functions. Thus as shown, in addition to including each task assignment of RAs (within example data blocks 215) mapped to a subset of the EAs of the GAS, system memory 108 further includes OTAM storage locations 217 for OTAM messages/data as well as OTAM storage locations 218 for receipt and tracking of acknowledgment (Ack). RA1 and RA2 both correspond to (or translate to) respective EAs of the tasks, which are assigned to track or enable OTAM operations by that task (or that particular processing node). Notably, while a single RA is illustrated, it is appreciated that the size of the various registers/storage locations assigned to OTAM processing may be several blocks of memory with multiple different RAs associated with the different blocks. The assigned RAs also are not necessarily sequential. Although shown within system memory 108, the assigned OTAM memory locations may be physically located other storage locations (e.g., within cache 112, FIG. 1). FIG. 3, which is described below, provides a more detailed view of the above introduced components of system memory 108.

The illustrated configuration of processors and memory subsystem (of caches and system memory) within data processing systems are presented herein for illustrative purposes only. The functional features of the embodiments described herein therefore apply to different configurations of data processing systems that (a) include some mechanism or logic for processing OTAM operations using EAs at the processor/user level and (b) provide a platform that supports the various functional features described herein.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa.

B. OTAM Instruction, Flag, Data and Ack

In order to initiate an OTAM operation, the instruction set architecture (ISA) is enhanced to include an OTAM instruction and to support one or more OTAM operations. FIG. 3 depicts an example OTAM instruction, by which an executing thread generates/triggers an OTAM operation. As shown, OTAM instruction 300 includes task/thread identifier (TID) 303, the effective address (EA) 305 corresponding to the real address at which the message is generated/stored and where specific tasks are targeted, the EA 307 corresponding to the RA of the memory location at which the node addresses of the various selected tasks of receive the OTAM message are located (utilized in embodiments where not every task needs to receive the message), and an acknowledgement request indicator 309, which indicates if an acknowledgement is required to be received from each recipient of the OTAM message. OTAM instruction 300 may also include OTAM message 311 and status bits 313 related to OTAM message, including, for example, one or more of: size of OTAM message, cache state information for data associated with OTAM message, and requirement for a synchronization operation following transmission of OTAM message.

Referring now to FIG. 4, there is illustrated a more detailed view of memory 108 depicting the various entries/fields that are created/populated during execution of an OTAM operation. Three real address locations are provided in OTAM facility 400 within memory, RA1 401, RA2 421, and RA3 431. Each indicated location may comprise multiple real addresses, which are not necessarily sequential. RA1 301 holds the OTAM message construct (217, FIG. 2), RA2 421 holds the OTAM acknowledgement construct (218, FIG. 2), and RA3 431 holds the incoming/received OTAM message sent from/by another task. During processor execution of a thread for task 1, an OTAM instruction, similar to the OTAM instruction 300 is encountered by which the thread initiates a sharing of a small amount of data and/or information with other threads of tasks executing across the different processing nodes. The processor executes the OTAM instruction and generates an OTAM message construct, within system memory 108. OTAM message construct is stored at RA1 401, which is the address pre-assigned to the thread/task by the OS or the global resource manager to enable OTAM operations. In one embodiment, this address is a dedicated address utilized solely for OTAM operations at the processing node. In another embodiment, OTAM message construct and OTAM acknowledgment construct are stored within architected registers 250, which may also store any received messages for the particular thread (or task). OTAM message construct comprises OTAM message 403, node identifiers (NID) 405 of the target nodes, task/thread IDs (TIDs) 407 of the target tasks/threads, and acknowledgement request indicator 409. The presence of NIDs 405 and TIDs 407 are optionally utilized with embodiments in which only specific tasks of the job are scheduled to receive the message. However, generally, since all nodes and all tasks of a job are known and recorded by the global resource manager during distribution of the parallel job across the different nodes, specific identifiers of the target nodes and target tasks are not required for a one-to-all message broadcast.

The Ack request indicator 409 is set to one or zero to indicate to the receiving task whether the sending tasks requires an acknowledgement from each recipient task of the receipt of the message. When the Ack request indicator 409 is set to indicate that an acknowledgment is required, the receiving tasks transmit a small acknowledgement message to the sending node. These acknowledgement messages are then compiled within OTAM acknowledgment construct. According to one embodiment, OTAM acknowledgement construct contains a node sequence 423 to order the receipt of the acknowledgements and an acknowledgment field 425. Acknowledgment field 425 is a plurality of single bit entries, one for each tasks or node from which an acknowledgement is received. The size of the acknowledgment field 425 is directly correlated to the number of tasks of the job executing across the different physical nodes and is thus a known quantity. For example, with a broadcast to 1028 nodes, the size of the acknowledgment entry 425 only needs to 1 kB to track each acknowledgment. The node sequence 423 indicates the ordering of the entries within the acknowledgement field.

When a OTAM message is received at the node, the HFI forwards the message to received OTAM receiver construct, which then provides/includes a copy of the received OTAM data/message 433, the NID 435 of the sending node, TID 437 of the sending task, and acknowledgement request field 439. Ack request field 439 contains a value other than null value whenever an acknowledgement has been requested by the OTAM message sender. In one embodiment, when the task retrieves this value, the task responds by sending a simple acknowledgment response directly to the sending node, and indicating within the response the TID of the sending task. The sending task may monitor for receipt of a full ACK entry (i.e., all bits set to indicate 100% acknowledgement). In one embodiment, the OS may reset the OMF 220 (FIG. 2) to alert the task that the message has been delivered to all other tasks across the distributed system.

Mechanisms of the processing nodes enable the internal communications between the task/thread and the memory and HFI to be completed either through standard OS processing, via user-level only processing, or via use of the HFI functionality. Utilizing the standard HFI functions, one embodiment, enables the HFI to communicate directly with the task via the cache subsystem. The HFI then retrieves OTAM message directly from a pre-determined location of the cache memory and provides a received OTAM message to the task via direct cache injection.

The actual transmission of the message and the acknowledgements across nodes is controlled by the respective HFIs/NICs of the various processing nodes. The use of the nodeID information and the HFI functionality nodes enables the OTAM operation to transmit small amounts of data/information via a broadcast to all associated nodes of the job. Importantly, the OTAM operation completes while the processor continues to execute subsequent instructions within the thread's (or the tasks') instruction stream.

Generally, with the above described hardware and software configurations and ISA enhancements, the present invention enables an executing thread to broadcast certain messages (typically messages that are not bandwidth intensive) via a one-to-all broadcast operation that occurs almost completely at the processor level. When a job is being run on a supercomputer, such as the distributed DPS 100 of FIG. 1, the executing threads typically need to communicate with each other. As noted in the background, the use of MPI collectives even for simple tasks was bandwidth intensive and subject to long latencies. With the implementation of the OTAM paradigm described herein, specific receiving blocks of system memory (or cache memory) are allocated at each node to accept OTAM messages, which are transmitted via a one-to-all broadcast. In one embodiment, the data that is being transmitted is temporarily gathered/stored at the pre-defined memory block and is transmitted based on a received/detected trigger. For one implementation, that trigger may be a barrier point within the memory block, such that the size of data transmitted via OTAM broadcast is limited to being below a certain, predetermined number of bits/bytes. The size of the block of memory assigned to store the OTAM message and/or to receive an OTAM message from another thread is pre-allocated and may be, for example 8 kB, where every thread is assigned 8 B of 1028 bits of data. The 8 kB is then pinned to memory or provided via architected registers during initiation of the task/thread on the processing node.

In another embodiment, the trigger is an actual OTAM instruction, which triggers the processor or HFI to activate the broadcast of the message data that is stored or collected (at/within the memory/cache block) or provided (along with the instruction). The processor or HFI is provided with the identifying data about which nodes and/or which tasks are associated with the sending task (via access to the global resource manager files generated during creation and distribution of the parallel job across the multiple nodes). With this new communication paradigm, each thread within a parallel job is able to communicate with the other threads of that job with a single message broadcast.

Figure 5B:
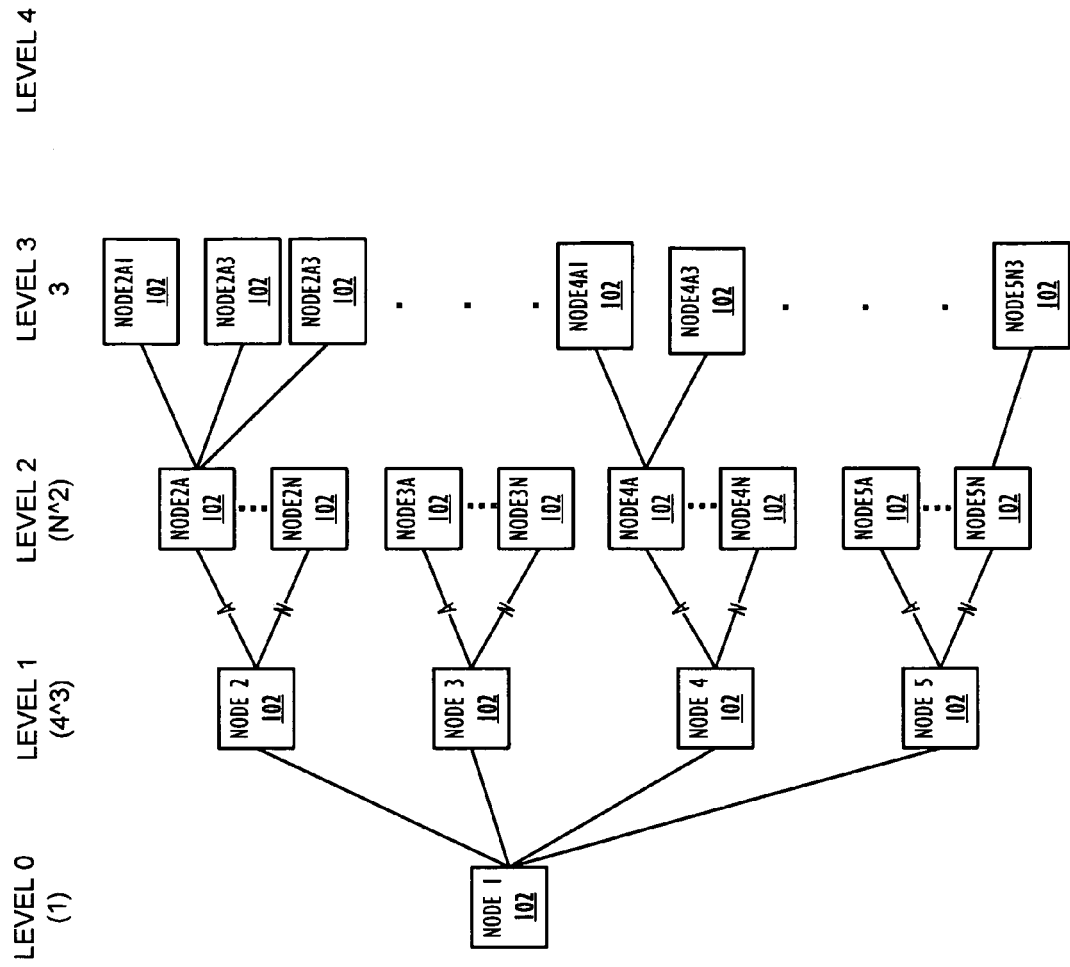
FIGS. 5A and 5B illustrate a block diagram of a processor socket and corresponding full graph of interconnected cluster of nodes, exhibiting the levels of scaling available with the one-to-all messaging paradigm within a distributed data processing system, according to one embodiment of the invention.
Figure 5A:
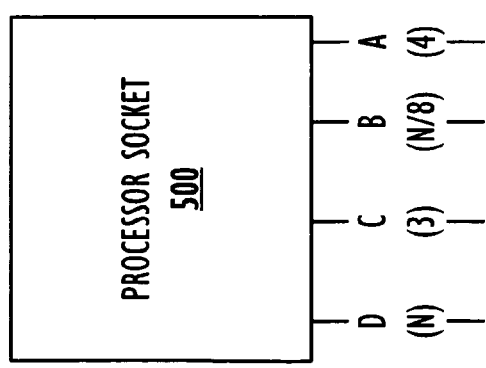

Execution of the OTAM operation over the network may occur via the processor, processor socket, server or set of servers. FIG. 5A illustrates an example with a processor socket having multiple buses A, B, C, and D, where bus supports the following number of ports: Port A (4); Port B (N/8); Port C (3); and Port D (N), where N is an integer value that is at least one (1). Port B is provided an actual numerical value of 8 for use in the computation below. However, as with each port presented, the numerical value assigned is solely for illustration herein. With the above allocation of broadcast ports for a single processor socket, the number of networked devices (processing nodes) that can be reached via an OTAM broadcast surpasses: $C*B^2*A^3$ or $3*8^2*4^3$ or 12,288 nodes. When extended on a scaled network connectivity view, the resulting scaled network connectivity is illustrated via the three tiered full graph of FIG. 5B, which also illustrates the levels of scalability associated with the performance of an OTAM operation from a single processor node. Thus, as can be seen, the OTAM communication paradigm provides an elegant all-to-all network created at the user level without adding any additional cost to the existing network. Each node is equipped with a relatively small facility to support the OTAM operations.

On the network side of the operation, use of the OTAM protocols reduces congestion issues as the amounts of data transmitted over the network is substantially reduced. According to one embodiment, several additional functional elements are implemented within the OTAM paradigm. First, the OTAM communication is provide a high priority for network transmission; Second, the OTAM protocol ensures that there are substantially no bandwidth concerns/issues when there are multiple high priority OTAM operations on the same bus; Third, the OTAM communication is implemented as a non-blocking operation; Fourth, the OTAM communication has a fixed time awareness component. Fifth, the OTAM communication ensures reliability utilizing the fixed time awareness. One embodiment provides for a fully reliable implementation of OTAM communication by implementing a full acknowledgement requirement, wherein all OTAM messages receive an acknowledgment from each receiving thread. In one implementation, the OTAM provides for a fll bounce mirroring of communication in a fixed time. Use of a single bit flag to indicate acknowledge receipt enables a large number of threads to be acknowledge within a very small space, utilizing very little hardware resources to implementing the acknowledgment function.

Figure 6A:
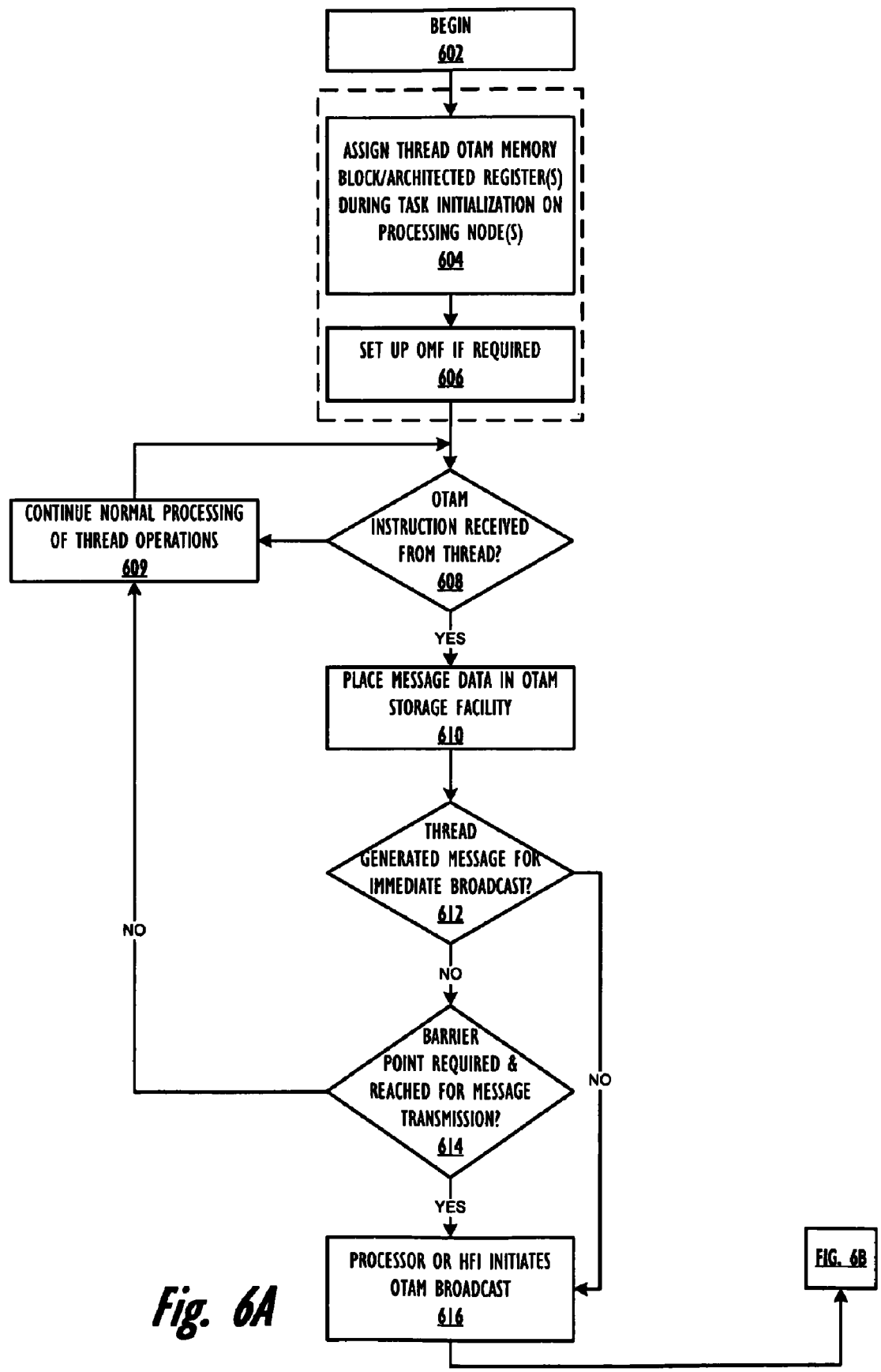
FIG. 6 (A and B) is a flow chart of the method by which an executing thread generates and transmits a one-to-all broadcast message within a multi-node, parallel computing, GSM environment, in accordance with one embodiment of the invention.
Figure 6B:
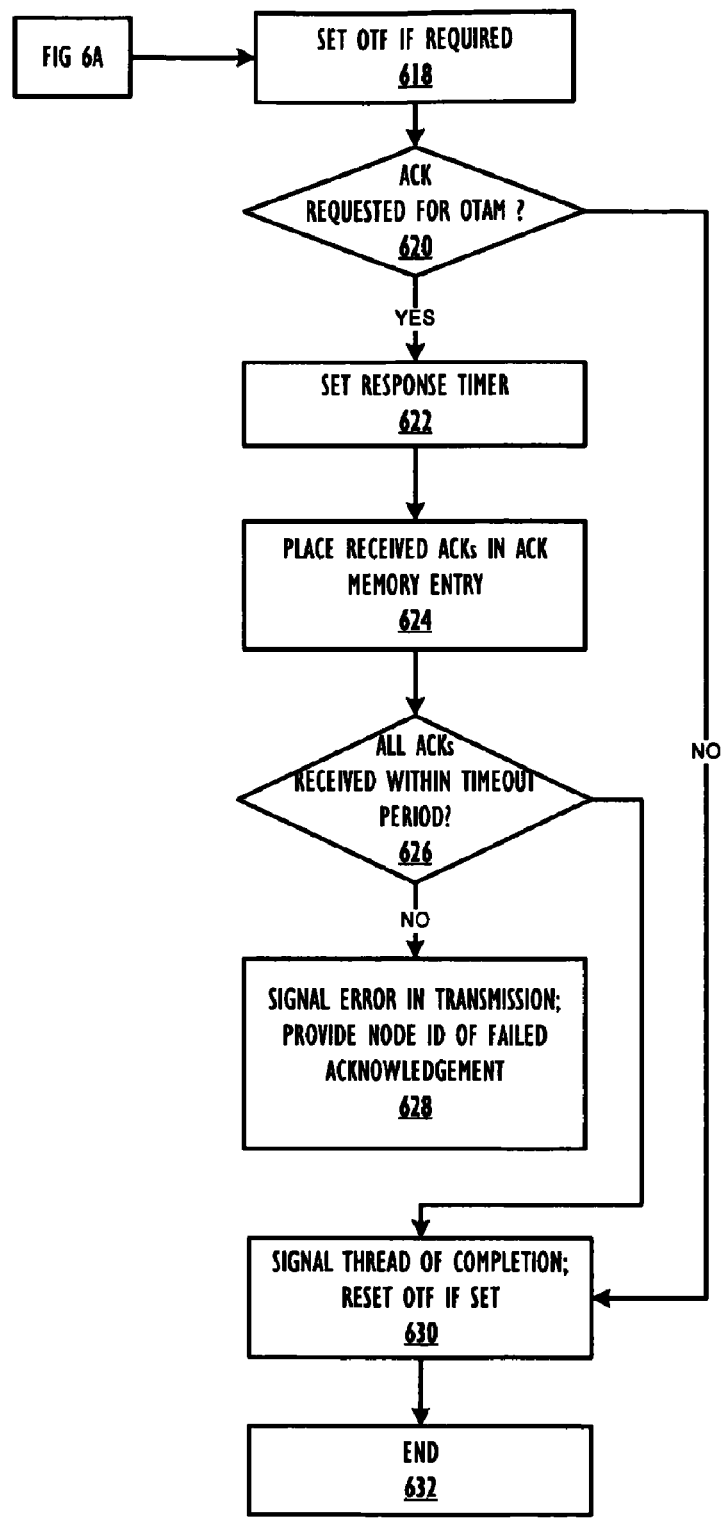

FIGS. 6(A-B) and 7 are flow charts illustrating various methods by which an OTAM operation is initiated and completed within a distributed DPS, such as DPS 100. Various portions of the method(s) are performed by processing unit executing instruction code of the executing task/thread, while other portions may be performed by HFI logic or by OTAM logic associated with or executing on the processor. The method(s) is/are generally described from the perspectives of processor operations, although it is understood that alternate embodiments of the method may be performed by HFI logic and OTAM logic. The first blocks of FIG. 6 may be performed by the global resource manager during set up of the threads on the particular processing nodes.

The method of FIG. 6(A-B) begins at block 602 and proceeds to block 604 at which the global resource manage (through the processor and/or operating system) assigns a block of memory and/or architected registers to be utilized for OTAM processing by the thread. The global resource manager also sets up the OMF at block 606, if one is required. It is appreciated that not every implementation of the OTAM paradigm requires an OMF. Proceeding to decision bock 608, the processor determines whether an OTAM instruction is received for the executing thread. In This context, the OTAM instruction is any instruction that indicates that a message/data is to be transmitted to remote processing threads via OTAM processing. If not OTAM instruction is received, the processor continues executing the thread instructions and completes all messaging and data operations according to standard processing operations. However, when an OTAM instruction is received/executed, the processor places the message data in the OTAM storage facility, at block 610. A first determination is then made at block 612 whether the OTAM instruction or other thread generated instruction requires immediate broadcast of the OTAM message/data. If immediate broadcast is not indicated by the thread, a next determination is made (by processing logic) at block 614 whether the barrier point is reached within the OTAM storage facility at which the message broadcast is triggered. In this embodiment, OTAM data is temporarily stored and compiled within the OTAM storage facility until the amount of OTAM data reaches some preset threshold (referred to herein as a barrier point). This usage of a barrier point enables the OTAM broadcast to be sent less frequently, while accomplishing the message transfer of a base amount of data during each OTAM transmission.

When the barrier point is reach or when the thread requested an immediate broadcast of the OTAM message/data, the processor or HFI is triggered to initiate the OTAM broadcast, and the processor or HFI broadcasts the OTAM message at block 616. In one embodiment, the generation of the specific OTAM message takes into consideration whether an acknowledgement is requested for the message and whether there are specific nodes identified by node IDs stored within a second storage facility to which the broadcast is targeted. Identifying information about the thread/task is included within the broadcast message so that each receiving node's HFI can determine if to accept the message (based, for example, on execution within the receiving node of threads of the same job). That TID may then be utilized to direct where an acknowledgement should be sent, although a broadcast acknowledgment (rather than a node-directed acknowledgment) may be permitted in some embodiments.

Returning to the flow chart, the processor or thread may then set the OTF if required, at block 618. A check is made at decision block 620 whether an acknowledgement was requested for the OTAM broadcast, and if yes, a response timer is set at block 622. The response time provides a window of time within which all acknowledgements should be received from every node processing threads of the job to which the OTAM message was sent. The value of the response time is a design parameter that is based on the type and speed of network and the number of nodes within the job cluster. At block 624, the HFI places all ACKs received in an OTAM ACK facility in memory, which facility is a block of memory that tracks each ACK as a single bit within a sequence of bits capable of being held in that memory location. At decision block 626, the processing logic determines if a full complement of ACKs has been received within the timeout period. If the full complement if ACKs was not received, the thread is signaled of the error in transmission, as shown in block 628, and in one embodiment, the processor/thread receives the node ID or thread ID of the remote thread that was none responsive to the OTAM broadcast. The thread may simply ignore the failed delivery or acknowledgement or implement some failure response mechanism, such as forwarding the OTAM message as a direct point to point transmission to the node of the non-responsive thread.

Returning to block 620, if there is no request for an ACK response to the OTAM message, the HFI signals the thread of completion of the OTAM broadcast at block 630, and the OTF is reset if required. A similar processing of block 630 occurs when an ACK response is requested and all the ACKs are received within the timeout period (as determined at block 626). The process then ends at block 632.

Figure 7:
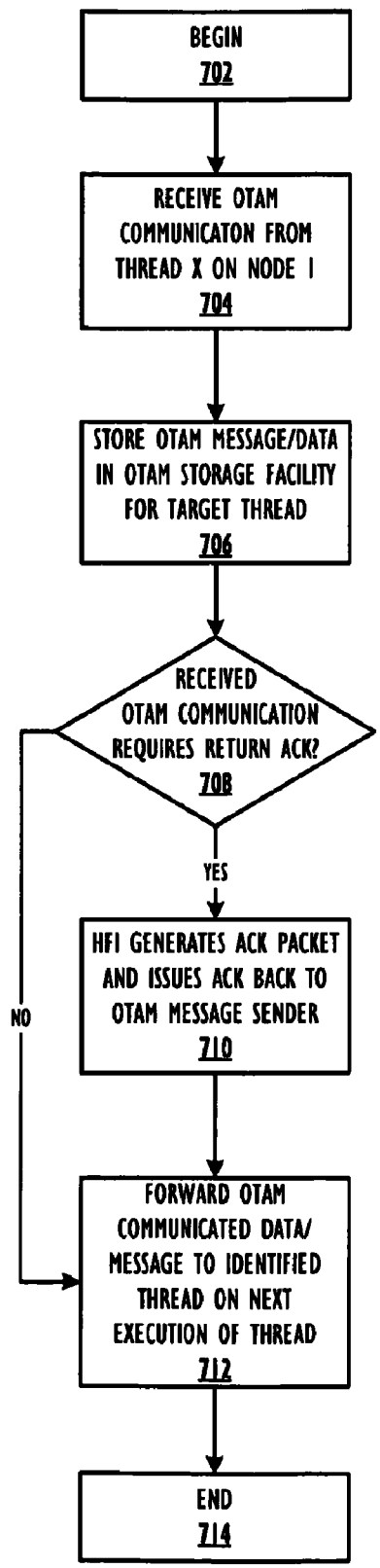
FIG. 7 is a flow chart illustrating the method by a thread confirms acknowledgement of a receipt by other threads of a transmitted one-to-all broadcast message, in accordance with one embodiment of the invention.

Turning now to the method of FIG. 7, which begins at initiation block 702. The method proceeds to block 704 at which a receiving node receives an OTAM communication, which was broadcasted by a thread executing an originating node (Node1). The HFI or processor of the receiving node first checks at block 703 whether a thread of the same job is currently executing at the receiving node. Once the HFI or processor confirms the execution of a related thread on the receiving node, the HFI or processor stores the OTAM message/data within the OTAM storage facility for the target thread, at block 706. At block 708, the HFI or processor determined if the received OTAM message included a request for an ACK. When an ACK is requested, the HFI generates the ACK and issues the ACK back to the originating node, as shown at block 710. Then, the receiving logic forwards the OTAM message/data to the thread identified as related to the issuing thread, at block 712. In this way, the receiving thread is able to utilize the data/message in local processing based on the particular usage for the received message/data. The process then ends at block 714.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As provided herein, the embodiments describe a method, computer system, and computer program product for providing user level message broadcast within a distributed parallel computing environment having a global shared memory (GSM). The disclosed embodiments provide: in a first processing node of a distributed data processing system having multiple processing nodes executing threads of a parallel job, a method for efficient inter-node communication among threads of the parallel job. The method comprises: generating at the first processing node one or more messages for transmission to at least one other processing node accessible via a network, wherein the one or more messages are generated by/for a first thread executing at the first processing node and the at least one other processing node executes one or more second threads of a same parallel job as the first thread; and transmitting via a host fabric interface (HFI) the one or more messages via a one-to-all broadcast on the network, wherein the one or more messages are transmitted to a cluster of processing nodes across the network that execute threads of the same parallel job as the first thread.

According to one embodiment, the generating comprises: storing data of the one or more messages within one or more of an OTAM facility and an architected register assigned to the first thread; and generating an OTAM operation comprising the data of the one or more messages, an identifier (ID) of the first thread, and an ID of the parallel job. Also, the transmitting comprises: forwarding the OTAM operation to a host fabric interface (HFI) of the first processing node; generating a transmission packet from information within the OTAM operation; and issuing the OTAM operation as a transmission packet by the HFI.

In one embodiment, the method further comprises: establishing a one to all messaging (OTAM) facility within a memory of the first processing node during set up of the first thread for execution at the first processing node; and providing the first thread with access to the OTAM facility. In one implementation, the establishing an OTAM facility includes: establishing one or more architected registers within the first processing node during set up of the first thread for execution at the first processing node; and providing the first thread with access information to the one or more architected registers.

Other aspects of the method comprises: including a request for an acknowledgement in the OTAM operation, wherein the issued one or more messages include a request to a receiving node that is processing a related thread to respond to receipt of the one or more messages with an ACK response; when an ACK response is received, updating an entry within an OTAM ACK facility to indicate receipt of the ACK response from a node executing a related thread from which the ACK response originated; and when all ACK responses are received, signaling the first thread of a completion of the OTAM broadcast and receipt by all intended recipients of the OTAM broadcast. Within this embodiment, the method may also provide: activating an ACK response timer to check for receipt of a full complement of ACK responses from all related threads of the parallel job executing at other nodes; and signaling failure of a completion of the OTAM broadcast when the full complement is not received before expiration of the timer.

Still one other aspect of the method provides: forwarding one or more data to an OTAM messaging facility for transmission via an OTAM broadcast; checking an amount of data within the OTAM messaging facility against a pre-established threshold/barrier point; and triggering the HFI to initiate the transmitting of the one or more messages when the amount of data reaches the pre-established threshold/barrier point. Further, the method may provide: receiving an OTAM instruction during execution of the first thread; initiating the generating of the one or more messages in response to the receiving the OTAM instruction; and when the OTAM instruction indicates an immediate transmission is required, triggering the transmitting of corresponding OTAM data at an earliest available broadcast slot of the HFI, wherein no barrier point is required to be met within the OTAM facility before initiating the OTAM broadcast.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a first processing node of a distributed data processing system having multiple processing nodes executing threads of a parallel job, a method for efficient inter-node communication among threads of the parallel job, the method comprising:

generating, at the first processing node, one or more messages for transmission to at least one other processing node accessible via a network, wherein the one or more messages are generated by/for a first thread executing at the first processing node and the at least one other processing node executes one or more second threads of a same parallel job as the first thread;

placing the one or more messages within a particular location in memory of the first processing node, wherein the placing of the one or more messages within the particular location triggers a transmission of the one or more messages; and in response to placing the one or more messages within the particular location in memory of the first processing node, transmitting, via a host fabric interface (HFI) of the first processing node, the one or more messages within a one-to-all messaging (OTAM) instruction broadcast on the network, wherein the one or more messages are transmitted to an HFI of one or more processing nodes in a cluster of processing nodes across the network that execute threads of the same parallel job as the first thread, wherein each of the cluster of processing nodes has allocated therein a plurality of receiving blocks to accept OTAM instruction broadcasts from other processing nodes in the cluster;

wherein an OTAM instruction includes at least:
a task/thread identifier (TID);
an effective address corresponding to a real address at which a message is generated/stored;
an effective address corresponding to a real address of the memory location at which one or more node addresses of one or more selected tasks of the one or more messages are located, an acknowledgement request indicator that indicates whether an acknowledgement is required to be received from each of the one or more processing nodes in the cluster; and
one or more of: an OTAM message and status bits related to OTAM message, wherein the status bits include one or more of: a size of the OTAM message, a cache state information for data associated with the OTAM message, and a requirement for a synchronization operation following transmission of the OTAM message.

2. The method of claim 1, further comprising:
during a setup of the first thread for execution at the first processing node, establishing a OTAM facility within a memory of the first processing node; and
providing the first thread with access to the OTAM facility;
wherein the cluster of processing nodes across the network that execute threads of the same parallel job as the first thread are identified by an OTAM flag in the processing node.

3. The method of claim 2, wherein establishing an OTAM facility further comprises:

during the setup of the first thread for execution at the first processing node, establishing one or more architected registers within the first processing node; and
providing the first thread with access information for the one or more architected registers.

4. The method of claim 1, wherein the particular location in memory is one or more of an OATM facility and an architected register assigned to the first thread, and said generating further comprises generating an OTAM operation comprising the data of the one or more messages, an identifier (ID) of the first thread, and an ID of the parallel job.

5. The method of claim 4, wherein said transmitting further comprises:
forwarding the OTAM operation to a host fabric interface (HFI) of the first processing node;
generating a transmission packet from information within the OTAM operation; and
issuing the OTAM operation as a transmission packet by the HFI.

6. The method of claim 4, further comprising:
including a request for an acknowledgement in the OTAM operation, wherein the issued one or more messages include a request to a receiving node that is processing a related thread to respond to receipt of the one or more messages with an acknowledgment (ACK) response;
activating an ACK response timer to check for receipt within a preset time interval of a full complement of ACK responses from all related threads of the parallel job executing at other nodes;
in response to receiving an ACK response, updating an entry within an OTAM ACK facility to indicate receipt of the ACK response from a node executing a related thread from which the ACK response originated;
in response to receiving the full complement of ACK responses before expiration of the preset time interval, signaling the first thread that receipt of the OTAM broadcast has completed for all intended recipients; and
in response to not receiving the full complement of ACK responses before expiration of the present time interval, signaling the first thread of a failure to complete the OTAM broadcast.

7. The method of claim 1, further comprising:
forwarding the one or more messages to an OTAM messaging facility for transmission via an OTAM broadcast;
checking an amount of data within the OTAM messaging facility against a pre-established threshold/barrier point; and
in response to the amount of data reaching the established threshold/barrier point, triggering the HFI to initiate the transmitting of the one or more messages.

8. The method of claim 7, further comprising:
receiving an OTAM instruction during execution of the first thread;
initiating the generating of the one or more messages in response to the receiving the OTAM instruction; and
detecting whether the OTAM instruction indicated an immediate transmission is required; and
in response to detecting that the OTAM instruction indicates an immediate transmission is required, triggering the transmitting of OTAM data corresponding to the OTAM instruction at an earliest available broadcast slot of the HFI, wherein no barrier point is required to be met within the OTAM facility before initiating the OTAM broadcast.

9. An article of manufacture embodied as a computer program product comprising:
a computer readable storage medium; and
program code on the computer readable storage medium that when executed by a first processing node of a distributed data processing system having multiple processing nodes executing threads of a parallel job, provides a method for efficient inter-node communication among threads of the parallel job, the method comprising:
generating, at the first processing node, one or more messages for transmission to at least one other processing node accessible via a network, wherein the one or more messages are generated by/for a first thread executing at the first processing node and the at least one other processing node executes one or more second threads of a same parallel job as the first thread, wherein said generating further comprises:
placing the one or more messages within a particular location in memory of the first processing node, wherein the placing of the one or more messages within the particular location triggers a transmission of the one or more messages, wherein the particular location in memory is one or more of an one to all messaging (OTAM) facility and an architected register assigned to the first thread;
generating an OTAM operation comprising the data of the one or more messages, an identifier (ID) of the first thread, and an ID of the parallel job; and
in response to placing the one or more messages within the particular location in memory of the first processing node, transmitting, via a host fabric interface (HFI) of the first processing node, the one or more messages within a one-to-all messaging (OTAM) instruction broadcast on the network, wherein the one or more messages are transmitted to an HFI of one or more processing nodes in a cluster of processing nodes across the network that execute threads of the same parallel job as the first thread, wherein each of the cluster of processing nodes has allocated therein a plurality of receiving blocks to accept OTAM instruction broadcasts from other processing nodes in the cluster;
wherein an OTAM instruction includes at least:
a task/thread identifier (TID);
an effective address corresponding to a real address at which a message is generated/stored;
an effective address corresponding to a real address of the memory location at which one or more node addresses of one or more selected tasks of the one or more messages are located, an acknowledgement request indicator that indicates whether an acknowledgement is required to be received from each of the one or more processing nodes in the cluster; and
one or more of: an OTAM message and status bits related to OTAM message, wherein the status bits include one or more of: a size of the OTAM message, a cache state information for data associated with the OTAM message, and a requirement for a synchronization operation following transmission of the OTAM message.

10. The article of manufacture of claim 9, wherein the program code further comprising code that executes to provide additional method functions comprising:
during a setup of the first thread for execution at the first processing node, establishing a OTAM facility within a memory of the first processing node; and
providing the first thread with access to the OTAM facility; and when the OTAM facility includes one or more architected registers:
    establishing the one or more architected registers within the first processing node during set up of the first thread for execution at the first processing node; and
    providing the first thread with access information for the one or more architected registers;
wherein the cluster of processing nodes across the network that execute threads of the same parallel job as the first thread are identified by an OTAM flag in the processing node.

11. The article of manufacture of claim 9, wherein the program code for completing the transmitting further comprising code that executes to provide:
    forwarding the OTAM operation to a host fabric interface (HFI) of the first processing node;
    generating a transmission packet from information within the OTAM operation; and
    issuing the OTAM operation as a transmission packet by the HFI.

12. The article of manufacture of claim 9, wherein the program code further comprising code that executes to provide additional method functions comprising:
    including a request for an acknowledgement in the OTAM operation, wherein the issued one or more messages include a request to a receiving node that is processing a related thread to respond to receipt of the one or more messages with an acknowledgment (ACK response;
    activating an ACK response timer to check for receipt within a preset time interval of a full complement of ACK responses from all related threads of the parallel job executing at other nodes;
    in response to receiving an ACK response, updating an entry within an OTAM ACK facility to indicate receipt of the ACK response from a node executing a related thread from which the ACK response originated;
    in response to receiving the full complement of ACK responses before expiration of the preset time interval, signaling the first thread that receipt of the OTAM broadcast has completed for all intended recipients; and
    in response to not receiving the full complement of ACK responses before expiration of the present time interval, signaling the first thread of a failure to complete the OTAM broadcast.

13. The article of manufacture of claim 9, wherein the program code further comprising code that executes to provide additional method functions comprising:
    forwarding the one or more messages to an OTAM messaging facility for transmission via an OTAM broadcast;
    checking an amount of data within the OTAM messaging facility against a pre-established threshold/barrier point; and
    in response to the amount of data reaching the established threshold/barrier point, triggering the HFI to initiate the transmitting of the one or more messages.

14. The article of manufacture of claim 13, wherein the program code further comprising code that executes to provide additional method functions comprising:
    receiving an OTAM instruction during execution of the first thread;
    initiating the generating of the one or more messages in response to the receiving the OTAM instruction; and
    detecting whether the OTAM instruction indicated an immediate transmission is required; and
    in response to detecting that the OTAM instruction indicates an immediate transmission is required, triggering the transmitting of OTAM data corresponding to the OTAM instruction at an earliest available broadcast slot of the HFI, wherein no barrier point is required to be met within the OTAM facility before initiating the OTAM broadcast.

15. A data processing system operating as a first processing node of a distributed data processing system having multiple processing nodes executing threads of a parallel job, the data processing system comprising:
    at least one processing unit;
    a memory coupled to the processing unit;
    a host fabric interface that controls communications between the data processing system and an external network; and
    program code executing on the processor which enables the data processing system to provide efficient inter-node communication among threads of the parallel job, said program code further comprising code that enables the data processing system to: for:
        generate, at the first processing node, one or more messages for transmission to at least one other processing node accessible via a network, wherein the one or more messages are generated by/for a first thread executing at the first processing node and the at least one other processing node executes one or more second threads of a same parallel job as the first thread, wherein said generating further comprises:
            place the one or more messages within a particular location in memory of the first processing node, wherein the placing of the one or more messages within the particular location triggers a transmission of the one or more messages, wherein the particular location in memory is one or more of an one to all messaging (OTAM) facility and an architected register assigned to the first thread;
            generate an OTAM operation comprising the data of the one or more messages, an identifier (ID) of the first thread, and an ID of the parallel job; and
        in response to placing the one or more messages within the particular location in memory of the first processing node, transmit, via a host fabric interface (HFI) of the first processing node, the one or more messages within a one-to-all (OTAM) instruction broadcast on the network, wherein the one or more messages are transmitted to an HFI of one or more processing nodes in a cluster of processing nodes across the network that execute threads of the same parallel job as the first thread, wherein each of the cluster of processing nodes has allocated therein a plurality of receiving blocks to accept OTAM instruction broadcasts from other processing nodes in the cluster;
        wherein an OTAM instruction includes at least:
            a task/thread identifier (TID);
            an effective address corresponding to a real address at which a message is generated/stored;
            an effective address corresponding to a real address of the memory location at which one or more node addresses of one or more selected tasks of the one or more messages are located, an acknowledgement request indicator that indicates whether an acknowledgement is required to be received from each of the one or more processing nodes in the cluster; and
            one or more of: an OTAM message and status bits related to OTAM message, wherein the status bits include one or more of: a size of the OTAM message, a cache state information for data associated with the OTAM message, and a requirement for a synchronization operation following transmission of the OTAM message.

16. The data processing system of claim 15, the program code further comprising code that enables the processor to:
during a setup of the first thread for execution at the first processing node, establish the OTAM facility within a memory of the first processing node during set up of the first thread for execution at the first processing node;
provide the first thread with access to the OTAM facility; and
when the OTAM facility includes one or more architected registers:
during the setup of the first thread for execution at the first processing node, establish one or more architected registers within the first processing node; and
provide the first thread with access information for the one or more architected registers;
wherein the cluster of processing nodes across the network that execute threads of the same parallel job as the first thread are identified by an OTAM flag in the processing node.

17. The data processing system of claim 15, the program code for completing the transmitting further comprising code that enables the processor to:
forward the OTAM operation to the host fabric interface (HFI);
generate, at the HFI, a transmission packet from information within the OTAM operation; and
issuing the OTAM operation as a transmission packet by the HFI.

18. The data processing system of claim 15, the program code further comprising code that enables the processor to:
include a request for an acknowledgement in the OTAM operation, wherein the issued one or more messages include a request to a receiving node that is processing a related thread to respond to receipt of the one or more messages with an acknowledgment (ACK) response;
activate an ACK response timer to check for receipt within a preset time interval of a full complement of ACK responses from all related threads of the parallel job executing at other nodes;
in response to receiving an ACK response, update an entry within an OTAM ACK facility to indicate receipt of the ACK response from a node executing a related thread from which the ACK response originated;
in response to receiving the full complement of ACK responses before expiration of the preset time interval, signal the first thread that receipt of the OTAM broadcast has completed for all intended recipients; and
in response to not receiving the full complement of ACK responses before expiration of the present time interval, signal the first thread of a failure to complete the OTAM broadcast.

19. The data processing system of claim 15, the program code further comprising code that enables the processor to:
forward the one or more messages to an OTAM messaging facility for transmission via an OTAM broadcast;
check an amount of data within the OTAM messaging facility against a pre-established threshold/barrier point; and
in response to the amount of data reaching the established threshold/barrier point, trigger the HFI to initiate the transmitting of the one or more messages.

20. The data processing system of claim 19, the program code further comprising code that enables the processor to:
receivean OTAM instruction during execution of the first thread;
initiate the generating of the one or more messages in response to the receiving the OTAM instruction; and
detect whether the OTAM instruction indicated an immediate transmission is required; and
in response to detecting that the OTAM instruction indicates an immediate transmission is required, trigger the transmitting of OTAM data corresponding to the OTAM instruction at an earliest available broadcast slot of the HFI, wherein no barrier point is required to be met within the OTAM facility before initiating the OTAM broadcast.

* * * * *